US012695366B2

(12) United States Patent　　　　　(10) Patent No.:　US 12,695,366 B2
Horii et al.　　　　　　　　　　　　　(45) Date of Patent:　　　Jul. 28, 2026

(54) LAMINATED IRON CORE AND MANUFACTURING DEVICE AND MANUFACTURING METHOD THEREFOR

(71) Applicant: KURODA PRECISION INDUSTRIES LTD., Kanagawa (JP)

(72) Inventors: Hideo Horii, Kanagawa (JP); Takahiko Kobayashi, Kanagawa (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 139 days.

(21) Appl. No.: 18/726,976

(22) PCT Filed: Apr. 26, 2022

(86) PCT No.: PCT/JP2022/018926

§ 371 (c)(1),
(2) Date: Jul. 5, 2024

(87) PCT Pub. No.: WO2023/209813

PCT Pub. Date: Nov. 2, 2023

(65) Prior Publication Data

US 2025/0112532 A1　　　Apr. 3, 2025

(51) Int. Cl.
H02K 15/0278　　　(2025.01)
B23K 26/00　　　　(2014.01)
(Continued)

(52) U.S. Cl.
CPC ..... H02K 15/0278 (2025.01); B23K 26/0093 (2013.01); H02K 15/027 (2025.01);
(Continued)

(58) Field of Classification Search
CPC ............ H02K 1/14; H02K 1/146; H02K 1/16; H02K 1/08; H02K 1/06; H02K 15/0278;
(Continued)

(56) References Cited

U.S. PATENT DOCUMENTS 4,316,111 A　*　2/1982　Merki ................... H02K 15/022
310/216.136
5,171,962 A　　12/1992　Sakanishi
(Continued)

FOREIGN PATENT DOCUMENTS

JP　　　　　S 5749 A　　　1/1982
JP　　　H 04105536 A　　　4/1992
(Continued)

OTHER PUBLICATIONS

International Search Report (with English translation) received in corresponding Application No. PCT/JP2022/018926, dated Jul. 12, 2022, 6 pages.

*Primary Examiner* — Maged M Almawri
(74) *Attorney, Agent, or Firm* — Dority & Manning, P.A.

(57)　　　　　　　　ABSTRACT

A manufacturing method for a laminated iron core for joining multiple iron core laminae by successively forming multiple spot-shaped welded parts on the multiple iron core laminae that are stacked includes: a first welding step of forming first welded parts, which constitute multiple welded parts, at a first pitch in a stacking direction on a first iron core lamina group composed of a part of the multiple iron core laminae; and a second welding step of forming, after the first welding step, second welded parts, which constitute the multiple welded parts, at a second pitch in the stacking direction on a second iron core lamina group composed of a part of the multiple iron core laminae adjoining the first iron core lamina group, wherein the second pitch is greater than the first pitch.

15 Claims, 8 Drawing Sheets

(51) Int. Cl.
*H02K 15/027* (2025.01)
*B23K 101/36* (2006.01)
*B23K 103/04* (2006.01)

(52) U.S. Cl.
CPC ...... *B23K 2101/36* (2018.08); *B23K 2103/04*
(2018.08); *H02K 2201/06* (2013.01)

(58) Field of Classification Search
CPC .... H02K 15/027; H02K 15/02; H02K 15/022;
H02K 15/026; H02K 2201/06; H02K
2201/09; B23K 26/0093; B23K 2101/36;
H01F 41/02
USPC ..... 310/216.004, 216.011–216.019, 216.059,
310/216.061, 216.062, 216.064, 216.065,
310/216.071, 216.073, 216.092, 216.096
See application file for complete search history.

(56) References Cited

U.S. PATENT DOCUMENTS

| | | | | |
|---|---|---|---|---|
| 8,887,376 | B2* | 11/2014 | Gerster | H01F 41/024 |
| | | | | 29/598 |
| 10,020,701 | B2* | 7/2018 | Kamiyoshihara | H02K 1/278 |
| 10,348,170 | B2* | 7/2019 | Izumi | H02K 15/02 |
| 11,261,513 | B2* | 3/2022 | Volbers | H01F 1/16 |
| 11,575,284 | B2 | 2/2023 | Eto et al. | |
| 11,652,374 | B2* | 5/2023 | Taniguchi | H02K 1/148 |
| | | | | 310/44 |
| 11,705,625 | B2* | 7/2023 | Tezuka | H01Q 1/2283 |
| | | | | 343/700 R |
| 11,973,369 | B2* | 4/2024 | Fujimura | H02K 1/12 |
| 12,191,709 | B2* | 1/2025 | Kinoshita | H02K 1/148 |
| 12,407,199 | B2* | 9/2025 | Volbers | H01F 41/0233 |
| 2002/0145359 | A1* | 10/2002 | Nishiyama | H02K 15/022 |
| | | | | 310/216.065 |
| 2002/0175586 | A1* | 11/2002 | Hill | H02K 19/103 |
| | | | | 310/179 |
| 2003/0197433 | A1* | 10/2003 | Cheung | H02K 35/02 |
| | | | | 310/156.01 |
| 2006/0043820 | A1* | 3/2006 | Nakahara | H02K 1/02 |
| | | | | 310/254.1 |
| 2010/0045120 | A1* | 2/2010 | Kitano | B22F 1/102 |
| | | | | 252/62.51 R |
| 2011/0037338 | A1* | 2/2011 | Leiber | H02K 15/022 |
| | | | | 310/216.105 |
| 2014/0070999 | A1* | 3/2014 | Kaneda | H01Q 1/2283 |
| | | | | 257/E21.705 |
| 2014/0084742 | A1* | 3/2014 | Gudewer | H02K 1/08 |
| | | | | 310/216.091 |
| 2014/0167894 | A1* | 6/2014 | Jajtic | H02K 1/02 |
| | | | | 335/297 |
| 2017/0047829 | A1* | 2/2017 | Hasuo | H02K 15/022 |
| 2017/0346351 | A1* | 11/2017 | Volbers | H02K 1/02 |
| 2018/0026501 | A1* | 1/2018 | Ogikubo | H02K 15/022 |
| | | | | 29/596 |
| 2018/0166951 | A1* | 6/2018 | Ronning | H02K 3/18 |
| 2019/0010361 | A1* | 1/2019 | Hoshi | C09J 163/00 |
| 2019/0181731 | A1* | 6/2019 | Yoshinaga | H02K 1/02 |
| 2020/0112210 | A1* | 4/2020 | Zhu | H02K 1/2766 |
| 2020/0161944 | A1* | 5/2020 | Das | H02K 1/146 |
| 2020/0321813 | A1* | 10/2020 | Eto | B23K 26/0622 |
| 2020/0381962 | A1* | 12/2020 | Georgiou | H02K 1/16 |
| 2021/0057969 | A1* | 2/2021 | Okudaira | B21D 43/22 |
| 2021/0091611 | A1* | 3/2021 | Volbers | H02K 3/18 |
| 2021/0351658 | A1* | 11/2021 | Jore | H02K 5/203 |
| 2021/0399594 | A1* | 12/2021 | Fujimura | H02K 1/12 |
| 2022/0006334 | A1* | 1/2022 | Wakisaka | H02K 1/06 |
| 2022/0028608 | A1* | 1/2022 | Kamikawabata | H01F 3/02 |
| 2022/0045582 | A1* | 2/2022 | Hunstable | H02K 15/08 |
| 2024/0313624 | A1* | 9/2024 | Kato | H02K 15/12 |

FOREIGN PATENT DOCUMENTS

| | | | |
|---|---|---|---|
| JP | H 5198451 | A | 8/1993 |
| JP | H 09149605 | A | 6/1997 |
| JP | 3012268 | B2 | 2/2000 |
| JP | 2006339381 | A | 12/2006 |
| JP | 2013109948 | A | 6/2013 |
| JP | 2020174427 | A | 10/2020 |

* cited by examiner

|  | welding pattern 1 | welding pattern 2 | welding pattern 3 | welding pattern 4 |
|---|---|---|---|---|
| R3 | P3 (large pitch) | P3 (large pitch) | P2 (middle pitch) | P1 (small pitch) |
| R2 | P2 (middle pitch) | P3 (large pitch) | P2 (middle pitch) | P2 (middle pitch) |
| R1 | P1 (small pitch) | P2 (middle pitch) | P1 (small pitch) | P1 (small pitch) |

LAMINATED IRON CORE AND MANUFACTURING DEVICE AND MANUFACTURING METHOD THEREFOR

CROSS-REFERENCE TO RELATED APPLICATIONS

This application is the U.S. National Stage entry of International Application No. PCT/JP2022/018926, filed on Apr. 26, 2022, which is hereby incorporated herein by reference in its entirety for all purposes.

TECHNICAL FIELD

The present invention relates to a laminated iron core used as a motor core or the like and a manufacturing device and a manufacturing method therefor.

BACKGROUND ART

Conventionally, in the manufacture of a laminated iron core, iron core laminae (thin plate-shaped steel plates) constituting the laminated iron core are sequentially punched from an electromagnetic steel sheet serving as material into a predetermined shape, and thereafter, a predetermined number of iron core laminae are joined together in a stacked state.

As one method for joining the iron core laminae, there is known a method in which the stacked multiple iron core laminae are joined by welding (such as laser welding). For example, as the manufacturing method for a laminated iron core using welding, there is known a method which, to ensure a sufficient joining strength between the iron core laminae, sequentially irradiates a spot of laser beam onto the boundaries between adjoining plates or each solid plate of the stacked steel plates (iron core laminae), wherein the spot diameter of the laser beam is more than twice the thickness of each steel plate so that three or more adjoining steel plates are sequentially welded to be joined (see Patent Document 1).

PRIOR ART DOCUMENT(S)

Patent Document(s)

Patent Document 1: JPH9-149605A

SUMMARY OF THE INVENTION

Task to be Accomplished by the Invention

In the method of successively forming multiple spot-shaped welded parts by using laser or the like as in the aforementioned Patent Document 1, by setting the pitch (interval) of adjoining welded parts as small as possible (namely, by making the overlapping region of adjoining welded parts as large as possible), it is possible to improve the joining strength between the iron core laminae by welding.

On the other hand, when the welding is performed successively while setting the pitch of adjoining welded parts to a small value, the amount of heat accumulated in the welded parts (namely, the amount of melt of the welded parts) gradually increases as the welding progresses. As a result of extensive research carried out by the inventors of the present application, it was found that there may be a case where due to such an increase of the amount of heat accumulated in the welded parts, an amount of contraction (tensile residual stress) when the temperature is lowered after the welding may excessively increase particularly in the welded parts positioned more inside (closer to the center in the stacking direction) of the laminated iron core. Such an increase of the amount of contraction of the welded parts can cause deformation of the laminated iron core.

In view of the foregoing background, an object of the present invention is to ensure the necessary joining strength between the iron core laminae while suppressing the excessive heat accumulation in the welded parts when manufacturing a laminated iron core by welding.

Means to Accomplish the Task

In the first aspect of the present invention, a manufacturing method for a laminated iron core for joining multiple iron core laminae by successively forming multiple spot-shaped welded parts on the multiple iron core laminae that are stacked, the manufacturing method comprises: a first welding step of forming first welded parts, which constitute the multiple welded parts, at a first pitch in a stacking direction on a first iron core lamina group composed of a part of the multiple iron core laminae; and a second welding step of forming, after the first welding step, second welded parts, which constitute the multiple welded parts, at a second pitch in the stacking direction on a second iron core lamina group composed of a part of the multiple iron core laminae adjoining the first iron core lamina group, wherein the second pitch is greater than the first pitch.

According to this, when manufacturing a laminated iron core by welding, it is possible to ensure the necessary joining strength between the iron core laminae while suppressing the excessive heat accumulation in the welded parts.

In the second aspect of the present invention, preferably, the manufacturing method further comprises a third welding step of forming, after the second welding step, third welded parts, which constitute the multiple welded parts, at a third pitch in the stacking direction on a third iron core lamina group composed of a part of the multiple iron core laminae adjoining the second iron core lamina group, the third pitch being different from the second pitch.

According to this, when manufacturing a laminated iron core by welding, it is possible to more stably ensure the necessary joining strength between the iron core laminae while suppressing the excessive heat accumulation in the welded parts.

In the third aspect of the present invention, preferably, the third pitch is greater than the second pitch.

According to this, it is possible to more stably suppress the excessive heat accumulation in the welded parts according to the thermal conductivity of the material forming the iron core laminae.

In the fourth aspect of the present invention, preferably, the third pitch is smaller than the second pitch.

According to this, it is possible to more stably ensure the necessary joining strength between the iron core laminae according to the thermal conductivity of the material forming the iron core laminae.

In the fifth aspect of the present invention, preferably, the third pitch is the same as the first pitch.

According to this, with a simple configuration, it is possible to stably ensure the necessary joining strength between the iron core laminae according to the thermal conductivity of the material forming the iron core laminae.

In the sixth aspect of the present invention, preferably, the first welding step, the second welding step, and the third welding step are executed repeatedly.

According to this, when manufacturing a laminated iron core by welding, it is possible to more properly ensure the necessary joining strength between the iron core laminae while more properly suppressing the excessive heat accumulation in the welded parts.

In the seventh aspect of the present invention, preferably, the first welding step further comprises a temperature measurement step of sequentially measuring a temperature of the first welded parts, and a timing to start the second welding step is decided based on the temperature of the first welded parts.

According to this, when manufacturing a laminated iron core by welding, it is possible to properly change the pitch of the welded parts according to the temperature of the welded parts.

In the eighth aspect of the present invention, preferably, the laminated iron core is composed of N (N is an integer) number of the iron core laminae, and the pitch at which the welded parts are formed is changed such that at least one of the welded parts is formed on an N-th iron core lamina.

According to this, regardless of the change of the pitch of the welded parts in a single laminated iron core, it is possible to reliably join the N-th iron core lamina (namely, the iron core lamina that is welded last).

In the ninth aspect of the present invention, a manufacturing device for a laminated iron core for joining multiple iron core laminae by successively forming multiple spot-shaped welded parts on the multiple iron core laminae that are stacked, the manufacturing device comprises: a laser irradiation unit configured to irradiate spot-shaped laser light onto the multiple iron core laminae thereby to form the multiple welded parts; and a laser controller configured to control irradiation of the laser light by the laser irradiation unit, wherein, under control of the laser controller, the laser irradiation unit forms first welded parts, which constitute the multiple welded parts, at a first pitch in a stacking direction on a first iron core lamina group composed of a part of the multiple iron core laminae, and forms second welded parts, which constitute the multiple welded parts, at a second pitch in the stacking direction on a second iron core lamina group composed of a part of the multiple iron core laminae adjoining the first iron core lamina group, and wherein the second pitch is greater than the first pitch.

According to this, when manufacturing a laminated iron core by welding, it is possible to ensure the necessary joining strength between iron core laminae while suppressing the excessive heat accumulation in the welded parts.

In the tenth aspect of the present invention, preferably, the manufacturing device further comprises a progressive die configured to sequentially punch the multiple iron core laminae from a sheet steel strip that is intermittently conveyed and to stack the multiple iron core laminae, wherein the laser irradiation unit is provided in the progressive die so as to be capable of irradiating the laser light into an iron core holding member configured to hold the iron core laminae whose outer shape has been punched from the sheet steel strip.

According to this, the multiple iron core laminae punched and stacked by the progressive die can be stably joined by welding.

In the eleventh aspect of the present invention, preferably, under control of the laser controller, the laser irradiation unit forms third welded parts, which constitute the multiple welded parts, at a third pitch in the stacking direction on a third iron core lamina group composed of a part of the multiple iron core laminae adjoining the second iron core lamina group, the third pitch being different from the second pitch.

According to this, when manufacturing a laminated iron core by welding, it is possible to more stably ensure the necessary joining strength between the iron core laminae while suppressing the excessive heat accumulation in the welded parts.

In the twelfth aspect of the present invention, preferably, the laser irradiation unit is configured to repeatedly execute formation of the first welded parts, the second welded parts, and the third welded parts.

According to this, when manufacturing a laminated iron core by welding, it is possible to more stably ensure the necessary joining strength between the iron core laminae while more stably suppressing the excessive heat accumulation in the welded parts.

In the thirteenth aspect of the present invention, preferably, the manufacturing device further comprises a temperature sensor configured to sequentially measure a temperature of the first welded parts, wherein the laser controller decides a timing to start formation of the second welded parts based on the temperature of the first welded parts.

According to this, when manufacturing a laminated iron core by welding, it is possible to properly change the pitch of the welded parts according to the temperature of the welded parts.

In the fourteenth aspect of the present invention, preferably, the laminated iron core is composed of N (N is an integer) number of iron core laminae, and at least one of the welded parts is formed on an N-th iron core lamina.

According to this, regardless of the change of the pitch of the welded parts in a single laminated iron core, it is possible to reliably join the N-th iron core lamina (namely, the iron core lamina that is welded last).

In the fifteenth aspect of the present invention, a laminated iron core comprises multiple iron core laminae joined by multiple spot-shaped welded parts successively formed on the multiple iron core laminae that are stacked, wherein the multiple welded parts comprise: first welded parts formed at a first pitch in a stacking direction of the multiple iron core laminae on a first iron core lamina group composed of a part of the multiple iron core laminae; and second welded parts formed at a second pitch in the stacking direction on a second iron core lamina group composed of a part of the multiple iron core laminae adjoining the first iron core lamina group, and wherein the second pitch is greater than the first pitch.

According to this, the necessary joining strength between the iron core laminae is ensured while the excessive heat accumulation in the welded parts is suppressed during the manufacture of the laminated iron core by welding. As a result, a laminated iron core which has a necessary joining strength between the iron core laminae and in which the amount of contraction of the welded parts is suppressed (namely, the manufacturing accuracy is enhanced) can be realized.

Effect of the Invention

Thus, according to the present invention, when manufacturing a laminated iron core by welding, it is possible to ensure the necessary joining strength between the iron core laminae while suppressing the excessive heat accumulation in the welded parts.

BRIEF DESCRIPTION OF THE DRAWINGS

FIG. 2 is a plan view showing one example of welded parts on a laminated iron core;

FIG. 3 is an explanatory diagram showing examples of the pitch of the welded parts formed on the laminated iron core;

FIG. 6 is an explanatory diagram showing examples of combination of pitches of the welded parts on the laminated iron core shown in FIG. 5;

MODE(S) FOR CARRYING OUT THE INVENTION

In the following, embodiments of the present invention will be described with reference to the drawings.

Figure 1:
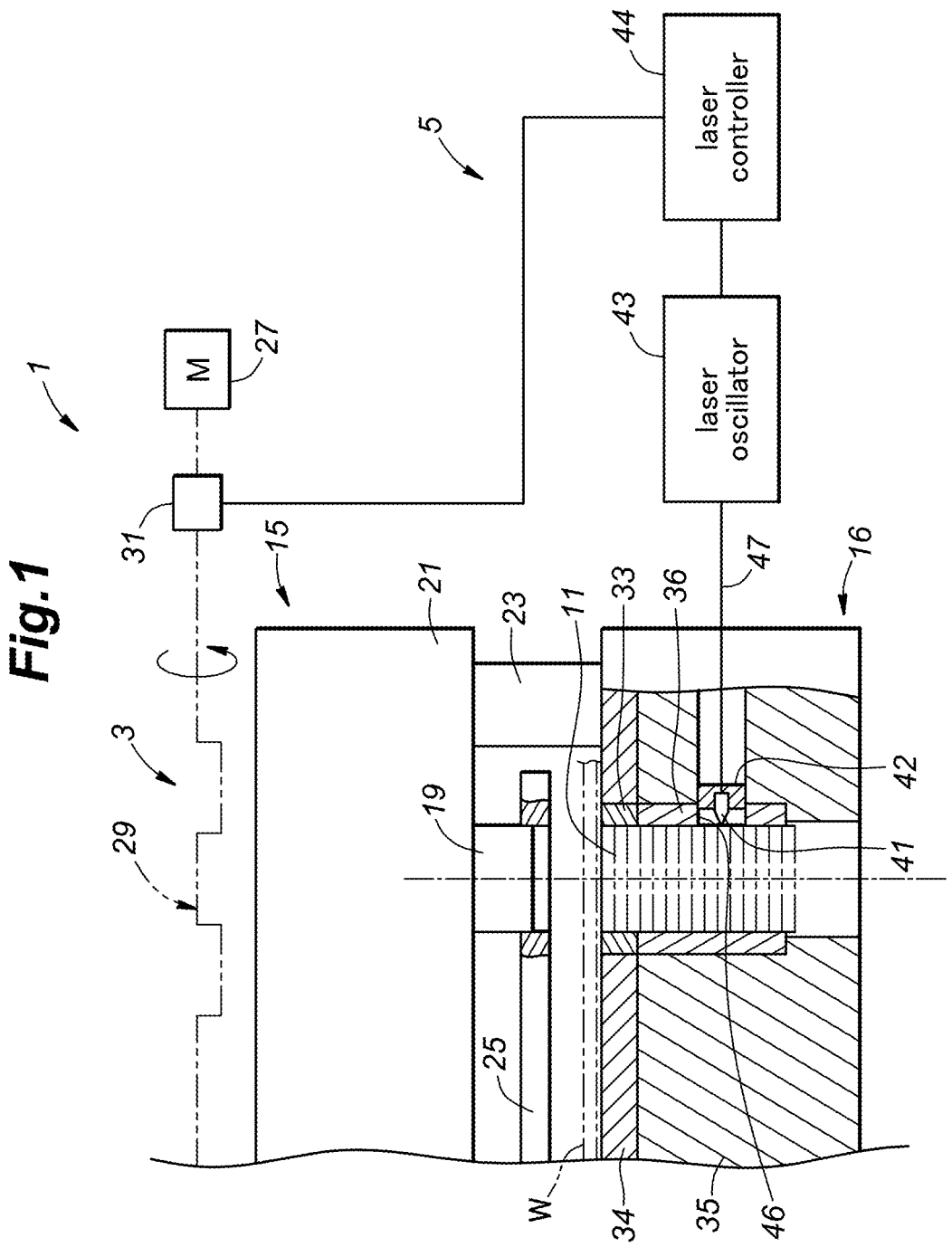
FIG. 1 is a diagram showing a main part of a laminated iron core manufacturing device according to an embodiment.

FIG. 1 is a diagram showing a main part of a laminated iron core manufacturing device 1 according to an embodiment of the present invention.

As shown in FIG. 1, the laminated iron core manufacturing device 1 includes a progressive die 3 and a welding device 5 annexed to it.

The progressive die 3 performs metal press working on a strip W made of an electromagnetic steel sheet (coiled metal material) thereby to manufacture a laminated iron core 13 formed of stacked iron core laminae 11 (thin plate-shaped core pieces). The progressive die 3 includes an upper die 15 provided to be reciprocally movable in the up-down direction and a lower die 16 fixed to a holder not shown in the drawings.

The upper die 15 includes multiple punches for punching the strip W (only a punch 19 for punching an outer shape of each iron core lamina 11 is shown in FIG. 1) and a punch retainer 21 for retaining the punches. Further, the upper die 15 includes multiple guide posts extending vertically to guide ascending and descending movements of the punch retainer 21 (here, only a guide post 23 is shown) and a stripper plate 25 which is slidably supported by a stripper guide (not shown in the drawings) to separate the strip W from the punches after punching.

Note that though detailed description is omitted, in the progressive die 3, punching processes for forming inner shapes such as pilot holes (positioning holes), slots, teeth, etc. are executed on the strip W as necessary. Thereby, the shape of each iron core lamina 11 constituting the laminated iron core 13 is successively formed in the strip W before the outer shape is punched.

An upper portion of the upper die 15 is fixed to a sliding part (not shown in the drawings) configured to reciprocate in the up-down direction (to move up and down with a stroke of about 25 mm to 35 mm, for example). With the sliding part, a rotational motion of a crankshaft 29 driven by an upper die driving motor 27 is converted to a vertical motion of the upper die 15 via connecting rods (not shown in the drawings). Also, the sliding part is provided with an encoder 31 for detecting the rotational phase of the crankshaft 29 (the rotation angle of the crankshaft 29 with respect to a reference rotational position) and generating an encoder signal (hereinafter referred to as "the synchronization signal") indicating the detection result.

The lower die 16 includes a die 33, a die plate 34, a die holder 35, and a squeeze ring 36 (iron core holding member).

The die 33 is provided with a substantially circular outer shape punching hole into which the substantially cylindrical punch 19 is inserted. The punch 19 cooperates with the die 33 to punch the outer shape of each iron core lamina 11. The periphery of the die 33 is held by the die plate 34. The lower surface of the die plate 34 is supported by the die holder 35.

The squeeze ring 36 is connected to the lower end of the die 33 and applies a side pressure (squeezing force) to the iron core laminae 11 stacked therein. The inner diameter of the squeeze ring 36 is set to be substantially equal to the inner diameter of the die 33 (set to be equal to, slightly smaller than, or slightly greater than the inner diameter), and the squeeze ring 36 causes the iron core laminae 11 punched by the punch 19 and deposited into the die 33 to sequentially move downward while holding them with a predetermined side pressure.

The iron core laminae 11 having the outer shape punched from the strip W are sequentially pushed into the die 33 by the punch 19 so as to overlap the top of the iron core laminae 11 punched earlier and received in the die 33. Thereby, each time a new iron core lamina 11 is punched, the iron core laminae 11 in the die 33 and in the squeeze ring 36 move intermittently toward an outlet side (here, downward) by a movement amount substantially corresponding to the thickness of each iron core lamina 11.

Note that in the progressive die 3, the iron core holding member for holding the punched iron core laminae 11 is not limited to the squeeze ring 36, and an arbitrary member having a substantially tubular shape may be used so long as it can at least accommodate multiple iron core laminae 11 and stack them. Also, other than aiming to impart a side pressure to the stacked iron core laminae 11, the iron core holding member may be designed aiming to align the iron core laminae with a tube hole (guide hole). Further, the hole shape of the iron core holding member may be not only circular but also in various shapes such as rectangular, fan-shaped, trapezoidal, T-shaped, etc. to conform to the shape of the iron core laminae 11.

Also, before performing laser welding with the welding device 5, it is possible, in the progressive die 3, to form projections and recesses for crimping in vertically adjoining iron core laminae 11 thereby to join the iron core laminae 11 by crimping, or to apply an adhesive agent to at least one of vertically adjoining iron core laminae 11 thereby to join the iron core laminae 11.

The welding device 5 includes laser irradiation units 41, irradiation adjustment units 42, a laser oscillator 43, and a laser controller 44.

Each laser irradiation unit 41 is provided to be able to irradiate laser light into the squeeze ring 36 through an opening part 46 that opens in a side portion (peripheral wall) of the squeeze ring 36. Each laser irradiation unit 41 is provided with a condenser lens (not shown in the drawings) for condensing the laser light. The condensed laser light is irradiated onto a predetermined position on the peripheral surface of the iron core laminae 11 stacked in the squeeze ring 36. The irradiated laser light has a predetermined spot shape on the peripheral surface of the iron core lamina 11.

In the present embodiment, the spot shape of the laser light is substantially circular, but it is not limited to this and may be other shape (for example, elliptical or rectangular). Also, each laser irradiation unit 41 can send out shielding gas (argon, helium, etc.) from the tip thereof to spray the shielding gas onto the welded part of the iron core laminae 11.

Note that the laser irradiation units 41 are provided in accordance with the number of welding locations on the laminated iron core 13. For example, in the example of FIG. 2 described later, the laser irradiation units 41 are provided to correspond to four welding locations. Also, the irradiation of laser light by the laser irradiation units 41 may be executed not only on the iron core laminae 11 stacked in the squeeze ring 36 but also on the iron core laminae 11 stacked in another arbitrary member having a substantially tubular shape such as the die 33 or the like. In this case, the installation position of the laser irradiation units 41 may be changed as appropriate to the vicinity of the irradiation positions for the iron core laminae 11 (for example, the die 33, the die plate 34, etc.).

Each irradiation adjustment unit 42 displaceably holds the corresponding laser irradiation unit 41 and is capable of changing the irradiation angle and the like of the laser light irradiated from the laser irradiation unit 41. For example, the initial position of the laser irradiation unit 41 may be set such that the irradiation direction of the laser light is a horizontal direction (a direction perpendicular the stacking direction of the iron core laminae 11). The irradiation adjustment unit 42 can change the irradiation angle of the laser light by tilting up and down the tip of the laser irradiation unit 41 formed with a light emitting opening about a pivot shaft perpendicular to both the stacking direction of the iron core laminae 11 and the irradiation direction of the laser light.

Also, the irradiation adjustment unit 42 can move the laser irradiation unit 41 in a horizontal direction. Therefore, the irradiation adjustment unit 42 can change the focal position of the laser light irradiated onto the peripheral surface of the iron core laminae 11 and thereby can change the size of the spot shape of the laser light (namely, the diameter of the laser light on the surface of the multiple iron core laminae 11 in the stacked state).

The laser oscillator 43 is connected to each laser irradiation unit 41 via an optical cable 47 and can introduce the oscillated laser light to the laser irradiation unit 41. Note that as the laser oscillator 43, a YAG laser oscillator, a $CO_2$ laser oscillator, a fiber laser oscillator or the like may be used as appropriate.

The laser controller 44 is connected to the laser oscillator 43 and controls the output and the oscillation mode of the laser light from the laser oscillator 43 by sending electric power and control signals to the laser oscillator 43. Thereby, the irradiation of laser light from the laser irradiation units 41 is controlled. The laser oscillator 43 can set the oscillation mode of the laser light to pulse oscillation by making the irradiation time relatively short or to continuous oscillation by making the irradiation time relatively long. Also, the laser oscillator 43 can suspend the irradiation of laser light from the laser irradiation unit 41 as necessary.

Further, the laser controller 44 is connected to the encoder 31 of the progressive die 3, for example, and receives the synchronization signal from the encoder 31. Based on the synchronization signal (the punching timing of each iron core lamina 11, and hence, the movement (descent) timing of the iron core laminae 11 in the squeeze ring 36), the laser controller 44 can adjust the irradiation timing of laser light onto the iron core laminae 11 and further can change the output and the oscillation mode of the laser light.

Figure 2:
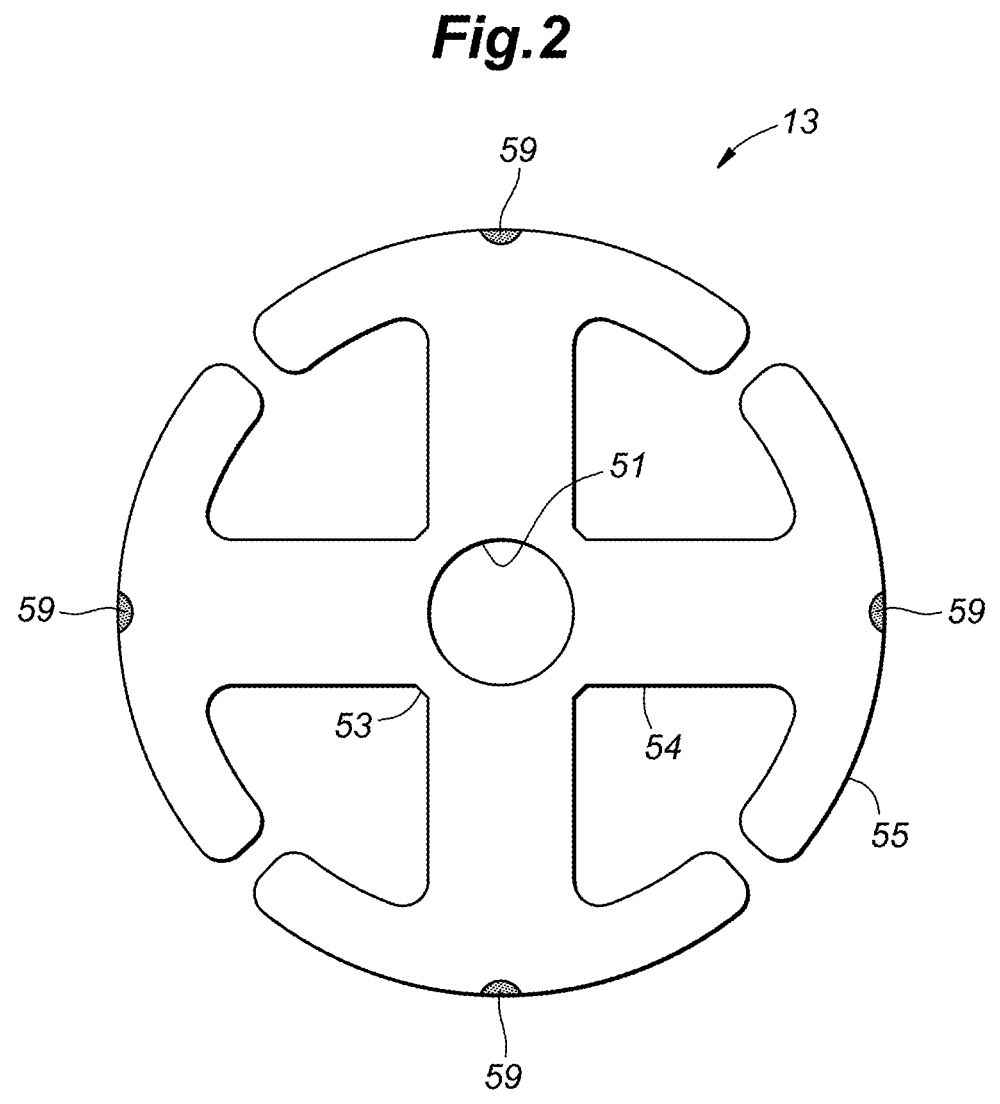

FIG. 2 is a plan view showing one example of welded parts 59 on the laminated iron core 13.

FIG. 2 shows an example in which the laminated iron core 13 is formed as a rotor (armature). The laminated iron core 13 is composed of a central part 53 formed with an axial hole 51 into which a motor shaft not shown in the drawings is to be fitted at an axial center thereof and four teeth 54 which are provided to protrude from the central part 53 in the radial direction and are provided at equal intervals in the circumferential direction. An outer end of each of the teeth 54 is provided with a magnetic pole part 55 which extends in both circumferential directions and opposes a stator not shown in the drawings.

The outer circumferential surface of the laminated iron core 13 is formed with welded parts 59 at multiple locations at predetermined intervals in the circumferential direction, as seen in plan view. Each welded part 59 is a part formed by heating and melting (welding mark) due to the irradiation of laser light onto the laminated iron core 13 (iron core laminae 11). Here, the welded parts 59 are formed on the outer circumferential surface of the magnetic pole part 55 of each of the teeth 54. Each welded part 59 is formed successively in the stacking direction of the iron core laminae 11 of the laminated iron core 13 (the direction perpendicular to the paper surface in FIG. 2) (namely, as a part of the welding mark including a series of welded parts 59).

Note that the pitches of the welded parts 59 at multiple locations in the circumferential direction shown in FIG. 2 are the same. Namely, the pitches of the multiple welded parts 59 successively formed in the stacking direction at the multiple locations are changed in the same way (or simultaneously) at the same position in the stacking direction. Note, however, that the multiple welded parts 59 at the multiple locations may be formed with mutually different pitches at the same position in the stacking direction. The shape of each of the iron core laminae 11 constituting the laminated iron core 13 is not limited to the example shown in FIG. 2 and may be in various shapes such as rectangular, fan-shaped, trapezoidal, T-shaped, U-shaped, etc. Also, the number and position of the welded parts 59 in the laminated iron core 13 may be changed as appropriate.

Figure 3:
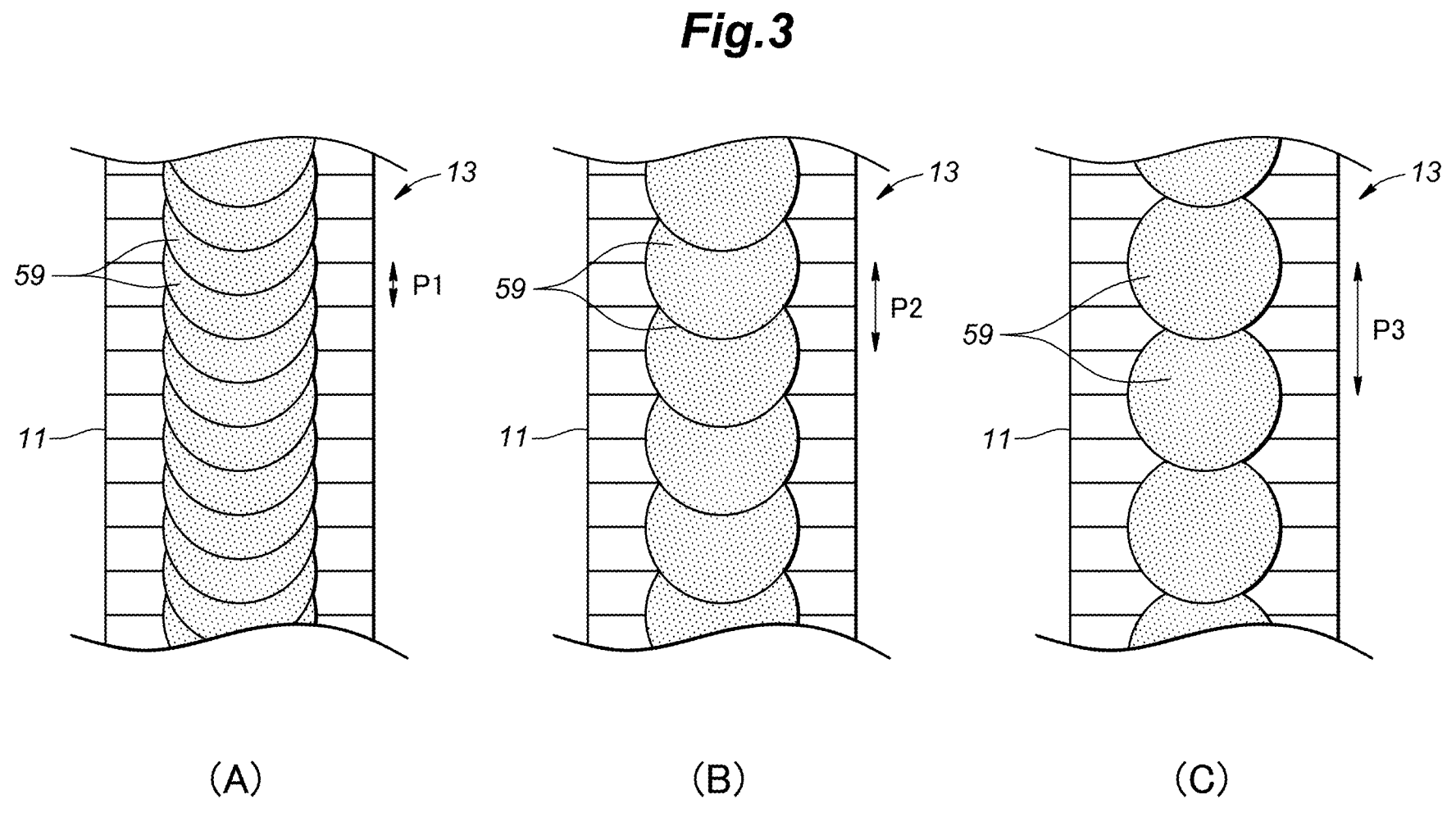
Figure 4:
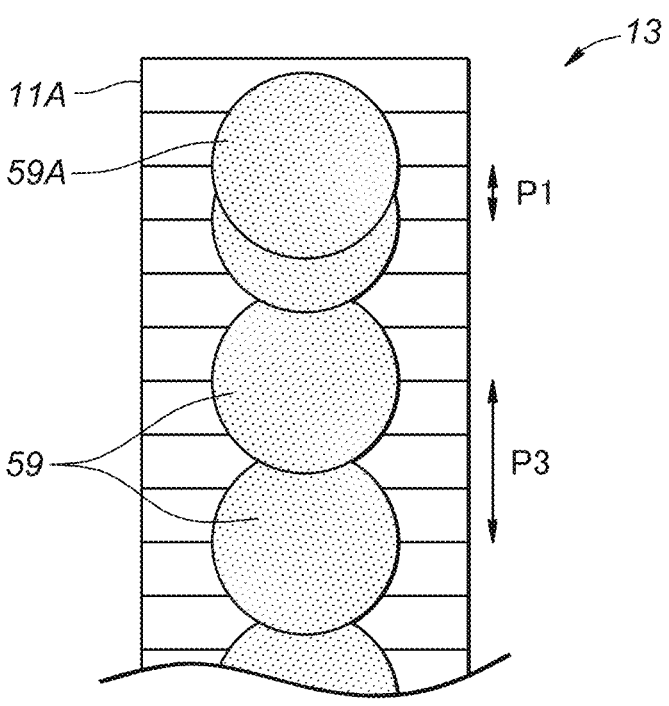
FIG. 4 is an explanatory diagram showing an example of the welded parts formed on an end portion of the laminated iron core.

FIG. 3 is an explanatory diagram showing examples of the pitch of the welded parts 59 formed on the laminated iron core 13. FIG. 4 is an explanatory diagram showing an example of the welded parts 59 formed on an end portion of the laminated iron core 13. In FIGS. 3 and 4, the welded parts 59 and the surroundings thereof on the laminated iron core 13 (stacked multiple iron core laminae 11) are shown schematically for convenience of explanation.

As shown in FIGS. 3(A) to 3(C), the welding device 5 can change the pitch of the welded parts 59. The pitch of the welded parts 59 corresponds to the distance between the centers of adjoining welded parts 59 (or the geometric centers of the outer shapes thereof). Change of the pitch of the welded parts 59 can be achieved by at least one of change of the irradiation direction and/or irradiation position of the laser light from the laser irradiation unit 41, change (including suspension) of the output of the laser light from the laser oscillator 43, and change of the oscillation mode of the laser light from the laser oscillator 43.

The shape of each welded part 59 (substantially corresponding to the shape of the spot-shaped laser light) is substantially circular. Also, the outer diameter of the welded part 59 (particularly, the diameter in the stacking direction of the iron core laminae 11) is set to be greater than three times and less than four times the thickness of each iron core lamina 11 in the stacking direction (the up-down direction in FIG. 3). Each welded part 59 may be formed over four or five adjoining iron core laminae 11, but here, is formed to join four iron core laminae 11 taking into account the joining strength provided by each welded part 59. Note that in the laminated iron core manufacturing device 1, the amount of heat accumulated in the welded parts may be adjusted by changing the beam diameter (ray diameter) of the laser light without changing the pitch of the welded parts 59. For example, it is possible to form the welded part 59 on each boundary part of the iron core laminae 11 adjoining each other (forming a pair) and to change the size of the spot shape of the laser light (for example, to selectively change to the diameter of 0.5, 1, or 1.5 times the plate thickness of each iron core lamina 11).

In FIGS. 3(A) to 3(C), the center of each welded part 59 is positioned at the boundary between adjoining iron core laminae 11. Note, however, that the position of each welded part 59 relative to the iron core lamina 11 may be changed as appropriate taking into account the overlap between each welded part 59 and the multiple iron core laminae 11 joined by each welded part 59. For example, the center of each welded part 59 may be positioned at the center of an iron core lamina 11 in the thickness direction.

FIG. 3(A) shows an example in which the pitch P1 of the welded parts 59 is set to be the same size as the thickness of each iron core lamina 11. As described above, even when the irradiation position of the laser light is fixed, the iron core laminae 11 stacked in the squeeze ring 36 intermittently move in a direction substantially perpendicular to the irradiation direction of the laser light every time each iron core lamina is punched (namely, by a thickness of each iron core lamina). Therefore, even in the case where the laser light is continuously irradiated from the laser irradiation unit 41, the effect of the irradiation becomes large when the iron core laminae 11 are at rest, and the welded parts 59 can be formed at the pitch P1 as shown in FIG. 3(A).

FIG. 3(B) shows an example in which the pitch P2 of the welded parts 59 is set to twice the thickness of each iron core lamina 11. FIG. 3(C) shows an example in which the pitch P3 of the welded parts 59 is set to three times the thickness of each iron core lamina 11. These pitches can be realized by at least one of changing the output of laser light from the laser oscillator 43 (including pauses) and changing the oscillation mode of the laser light from the laser oscillator 43.

Note that the size of the outer diameter of each welded part 59 and the pitch applicable to the welded parts 59 are not limited to the examples shown in FIGS. 3(A) to 3(C) so long as at least the joining force required between the iron core laminae 11 can be ensured. For example, it is possible to adopt a greater pitch by setting the outer diameter of each welded part 59 larger. Also, the pitch of the welded parts 59 is not limited to an integer multiple of the thickness of each iron core lamina 11 and may be set to an arbitrary size.

Also, in the case where the pitch P1 of the welded parts 59 is changed to the pitch P2, for example, the welded part 59 positioned at the rear end (here, the upper end) of the multiple welded parts 59 formed at the pitch P1 becomes the welded part 59 positioned at the front end (here, the lower end) of the multiple welded parts 59 formed at the pitch P2. Note, however, that the pitch of the welded parts 59 positioned at the boundary between the pitch P1 and the pitch P2 of the welded parts 59 may be a pitch other than the pitches P1 and P2 (for example, a pitch greater than the pitch P1 and smaller than the pitch P2 or a pitch smaller than the pitch P1). More specifically, the welded part 59 positioned at the rear end of the multiple welded parts 59 formed at the pitch P1 and the welded part 59 positioned at the front end of the multiple welded parts 59 formed at the pitch P2 may be separate welded parts 59 and the pitch between them may be a pitch other than the pitches P1 and P2. Thereby, the relative position of each of the welded parts 9 formed at the pitch after the change (here, the pitch P2) with respect to each iron core lamina 11 can be adjusted. Such a configuration may be similarly applied to the change of pitch other than the pitches P1 and P2.

Also, when a pitch greater than the thickness of each iron core lamina 11, such as the pitch P2 or the pitch P3, is used, there may be a case where the welded parts 59 cannot be formed at the same pitch to the iron core lamina 11 at the rearmost portion of the laminated iron core 13 (here, the iron core lamina 11 positioned in the uppermost layer of the laminated iron core 13 or the iron core lamina 11 adjacent thereto). In other words, there may be a case where the welded part 59 is not formed at the rearmost portion of the laminated iron core 13 or, if the welded part 59 is formed, the welded part 59 extends out beyond the end surface of the laminated iron core 13.

Therefore, when a pitch greater than the thickness of each iron core lamina 11 is used, the welding device 5 can change the pitch as necessary for the iron core laminae 11 in the rearmost portion of the laminated iron core 13.

FIG. 4 shows an example in which the pitch P3 of the welded parts 59 is changed to the smaller pitch P1. In the case where the laminated iron core 13 is composed of an N (N is an integer) number of iron core laminae 11, the pitch at which the welded parts 59A are formed is changed so that at least one welded part is formed on the N-th iron core lamina 11A which is welded last.

More specifically, with the welding at the pitch P3 shown in FIG. 4, the laser light for forming the welded part 59 corresponding to the N-th iron core lamina 11A (the upper-most layer in FIG. 4) would extend out beyond the upper edge of the iron core lamina 11A, and therefore, the welding cannot be performed as is. Therefore, for the N-th iron core lamina 11A, the pitch P3 is changed to the pitch P1, whereby a welded part 59A is formed on the N-th iron core lamina 11A.

Note that in the example of FIG. 4, the pitch of only the last formed welded part 59 is changed, but it is not limited to this, and the pitch of the multiple welded parts 59 formed on the one or more iron core laminae 11 in the rearmost portion may be changed. Also, the change of the pitch of the welded parts 59 is enough if at least the iron core lamina 11A that is welded last is properly joined to the adjacent iron core lamina 11, and is not limited to the change from the pitch P3 to the pitch PT.

Also, such a change of the pitch is enough if the pitch is changed to a pitch smaller than at least the pitch immediately before, and is not limited to the change to the pitch PT. Note, however, that by changing the pitch to the pitch P1 (the pitch having the same size as the thickness of each iron core lamina 11), there is an advantage that the joining force in the end portion of the laminated iron core 13 increases and the strength of the laminated iron core 13 as a whole can be maintained stably.

Figure 5:
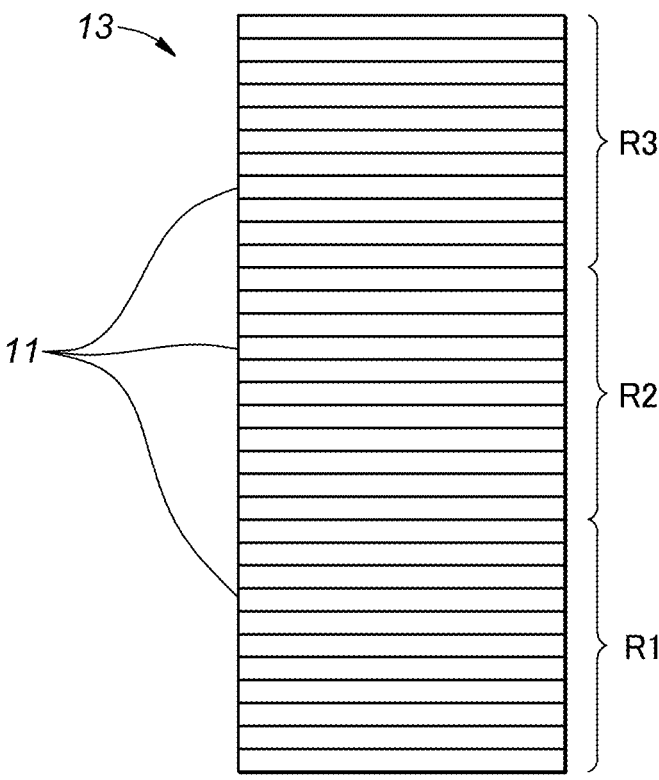
FIG. 5 is an explanatory diagram showing an example in which the laminated iron core includes multiple regions having different pitches of the welded parts.

FIG. 5 is an explanatory diagram showing an example in which the laminated iron core 13 includes multiple regions having different pitches of the welded parts 59. FIG. 6 is an explanatory diagram showing an example of combinations of the pitches of the welded parts 59 in the laminated iron core shown in FIG. 5.

As shown in FIG. 5, for example, the multiple pitches of the welded part 59 described above may be applied to multiple regions (here, first to third regions R1 to R3) of the laminated iron core 13 which are separated in the stacking direction, respectively. The first to third regions R1 to R3 include respective blocks (first to third iron core lamina groups) each composed of multiple iron core laminae 11.

In the example of FIG. 5, the region R1 constitutes a lower portion of the laminated iron core 13 (including the iron core lamina 11 in the lowermost layer at which the welding for the one laminated iron core 13 is started). The region R2 constitutes an intermediate portion of the laminated iron core 13. The region R3 constitutes an upper portion of the laminated iron core 13 (including the iron core lamina 11 in the uppermost layer at which the welding for the one laminated iron core 13 ends). Note that the number of iron core laminae 11 constituting each of the regions R1 to R3 may not be necessarily set beforehand (before the start of the welding), and may be set as a result of changing the pitch of the welded parts 59.

In FIG. 6, a welding pattern 1 is an example in which the small pitch P1 (the first pitch in the welding pattern 1), the middle pitch P2 (the second pitch in the welding pattern 1), and the large pitch P3 (the third pitch in the welding pattern 1) are applied to the regions R1, R2, and R3, respectively. In other words, in the welding pattern 1, the pitch of the welded parts 59 gradually increases in order of the regions R1, R2, and R3. Namely, in the welding pattern 1, three welding steps (first to third welding steps) with mutually different pitches of the welded parts 59 are executed.

With this welding pattern 1, in the region R1 in which the pitch is relatively small, the amount of heat accumulated in the welded parts 59 gradually increases (it becomes difficult to dissipate heat) as the welding proceeds. However, with the welding pattern 1, the pitch is increased in the region R2 (here, changed from the small pitch to the middle pitch) before such heat accumulation becomes excessive, whereby increase in the amount of heat accumulated in the welded parts 59 thereafter can be suppressed.

Also, with the welding pattern 1, the amount of heat accumulated in the welded parts 59 gradually increases in the region R2 also as the welding proceeds. However, with the welding pattern 1, the pitch is increased in the region R3 (here, changed from the middle pitch to the large pitch) before such heat accumulation becomes excessive, whereby increase in the amount of heat accumulated in the welded parts 59 thereafter can be suppressed.

The welding pattern 2 is an example in which the middle pitch P2 (the first pitch in the welding pattern 2) and the large pitch P3 (the second pitch in the welding pattern 2) are respectively applied to the region R1 and to the regions R2 and R3. In other words, with the welding pattern 2, the pitch of the welded parts 59 increases at the transition from the region R1 to the region R2, and in the subsequent region R3, the same pitch as in the region R2 is applied. Namely, in the welding pattern 2, two welding steps (first and second welding steps) with mutually different pitches of the welded parts 59 are executed.

With this welding pattern 2, even in the case where the thermal conductivity of the material of the iron core laminae 11 is relatively low, heat accumulation in each welded part 59 can be suppressed by applying the pitch P2 (middle pitch) to the region R1.

Also, with the welding pattern 2, as the welding proceeds the amount of heat accumulated in the welded parts 59 gradually increases in the region R1. However, with the welding pattern 2, the pitch is increased in the region R2 (here, changed from the middle pitch to the large pitch) before such heat accumulation becomes excessive, whereby increase in the amount of heat accumulated in the welded parts 59 thereafter can be suppressed.

Note that in the case where the thermal conductivity of the material of the iron core laminae 11 is higher than in the case of the welding pattern 1, as shown in the welding pattern 3, the small pitch P1 (the first pitch in the welding pattern 3) and the middle pitch P2 (the second pitch the welding pattern 3) may be respectively applied to the region R1 and to the regions R2 and R3.

Further, in the region R3 in the welding pattern 3, the same pitch as in the region R2 is applied, but if the amount of heat accumulated in the welded parts 59 in the region R2 can be suppressed, the pitch of the welded parts 59 may be reduced again (here, changed to the large pitch) as shown in the welding pattern 4. Thereby, the joining strength of the iron core laminae 11 in the region R3 (the end portion of the laminated iron core 13) can be increased. Such a pitch reduction can be adopted in the region R3 in the welding pattern 2.

The regions in which the pitch of the welded parts 59 is changed in the laminated iron core 13 are not limited to the regions R1 to R3 exemplarily shown in FIG. 5. The number of regions and the size of each region (namely, the number of iron core laminae 11 constituting each region) may be changed as appropriate. Also, the welding patterns are not limited to those exemplarily shown in FIG. 6. For example, either one of the welding patterns 1 to 4 may be repeatedly executed in one laminated iron core 13. In that case, for example, in the case of the welding pattern 1, after (on the upper side of) the regions R1 to R3 shown in FIG. 5 (more precisely, the regions R1 to R3 in each of which the number of iron core laminae 11 constituting it is reduced), the regions R1 to R3 may be set again. Further, one or more patterns of the welding patterns 1 to 4 described above may be executed in combination in one laminated iron core 13.

In such a laminated iron core 13, a necessary joining strength between the iron core laminae 11 is ensured and excessive heat accumulation in the welded parts 59 is suppressed during manufacture by welding. As a result, the laminated iron core 13 has a necessary joining strength between the iron core laminae 11 and the amount of contraction of the welded parts 59 is suppressed (namely, manufacturing accuracy is enhanced).

Figure 7:
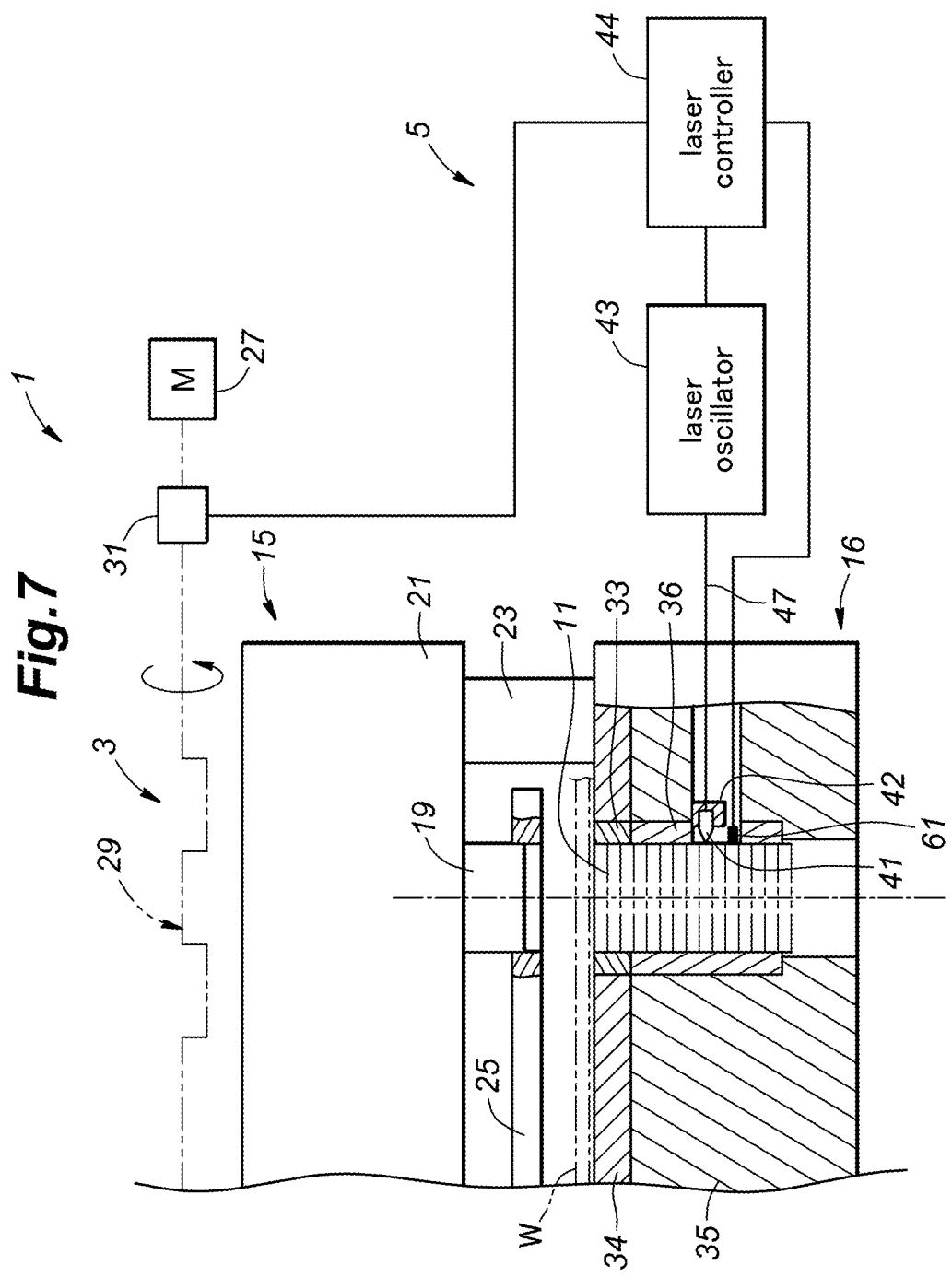
FIG. 7 is a diagram showing a first modification of the laminated iron core manufacturing device shown in FIG. 1.
Figure 8:
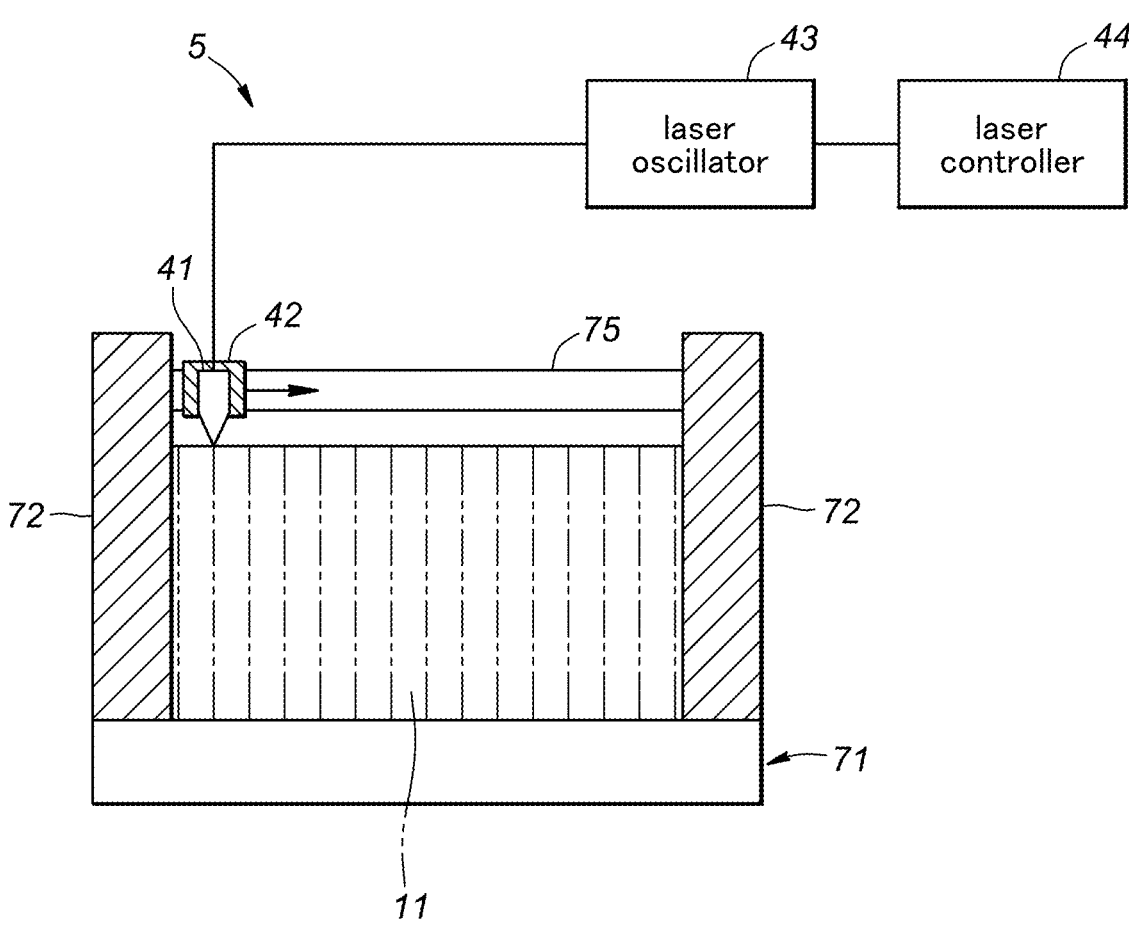
FIG. 8 is a diagram showing a second modification of the laminated iron core manufacturing device shown in FIG. 1.

FIGS. 7 and 8 are diagrams showing first and second modifications of the laminated iron core manufacturing device 1 shown in FIG. 1, respectively. In FIGS. 7 and 8, components identical with those of the manufacturing device 1 shown in FIG. 1 are denoted by the same reference signs. Also, as to the first and the second modifications, matters not specifically mentioned below are the same as in the manufacturing device 1 shown in FIG. 1.

As shown in FIG. 7, in the laminated iron core manufacturing device 1 according to the first modification, a temperature sensor 61 capable of measuring the temperature of the welded part 59 immediately after being welded (formed) is provided in the welding device 5. The laser controller 44 is connected to the temperature sensor 61 and receives the temperature detection result (detection signal) from the temperature sensor 61. Accordingly, based on the temperature detection result, the laser controller 44 can decide the timing of change of the pitch of the welded parts 59.

For example, with the welding pattern 1 shown in FIG. 6, the temperature of the welded parts 59 formed in the region R1 is sequentially measured, and the laser controller 44 can change the small pitch P1 of the welded parts 59 to the middle pitch P2 (namely, starts the formation of the welded parts in the region R2) at the timing when the measured temperature becomes equal to or higher than a predetermined temperature (threshold value) (or at the timing when this state continues beyond a predetermined time). In accordance with this, the numbers of iron core laminae 11 constituting the regions R1 and R2 are also changed.

Also, as shown in FIG. 8, in the laminated iron core manufacturing device 1 according to the second modification, the welding device 5 may be provided independently from the progressive die 3.

The welding device 5 includes a support base 71 on which the stacked iron core laminae 11 are supported. The support base 71 is provided with a pair of fixing members 72, 72 for sandwiching the end surfaces of the stacked iron core laminae 11.

In the welding device 5, with the stacked iron core laminae 11 being fixed on the support base 71, the laser irradiation unit 41 is movable in the stacking direction along a guide rail 75. Therefore, similarly to the welding device 5 shown in FIG. 1, the welding device 5 can perform welding of the multiple iron core laminae 11 while changing the pitch of the welded parts 59.

The present invention has been described in the foregoing in terms the specific embodiments thereof, but these embodiments are mere examples, and the present invention is not limited by these embodiments. Not all of the structural elements of the laminated iron core and the manufacturing device and the manufacturing method therefor according to the present invention shown in the above embodiments are necessarily indispensable and they may be selectively adopted as appropriate without departing from the scope of the present invention.

For example, the welding method of the welding device 5 according to the present invention is not limited to the laser welding, and arc welding, such as Tig (Tungsten Inert Gas) welding, Mig (Metal Inert Gas) welding, and Mag (Metal Active Gas) welding, electron beam welding, or the like may be used.

LIST OF REFERENCE NUMERALS

1: manufacturing device for laminated iron core
3: progressive die
4: welding pattern
5: welding device
11: iron core lamina
13: laminated iron core
15: upper die
16: lower die
19: punch
21: punch retainer
25: stripper plate
27: motor
29: crankshaft
31: encoder
33: die
36: squeeze ring
41: laser irradiation unit
42: irradiation adjustment unit
43: laser oscillator
44: laser controller
46: opening part

14

47: optical cable
51: axial hole
53: central part
54: teeth
55: magnetic pole part
59: welded part
61: temperature sensor
71: support base
72: fixing member
75: guide rail
R1: first region (first iron core lamina group)
R2: second region (second iron core lamina group)
R3: third region (third iron core lamina group)
W: strip

The invention claimed is:

1. A manufacturing method for a laminated iron core for joining multiple iron core laminae by successively forming multiple spot-shaped welded parts on the multiple iron core laminae that are stacked, the manufacturing method comprising:
a first welding step of forming first welded parts, which constitute the multiple welded parts, at a first pitch in a stacking direction on a first iron core lamina group composed of a part of the multiple iron core laminae; and
a second welding step of forming, after the first welding step, second welded parts, which constitute the multiple welded parts, at a second pitch in the stacking direction on a second iron core lamina group composed of a part of the multiple iron core laminae adjoining the first iron core lamina group,
wherein the second pitch is greater than the first pitch.

2. The manufacturing method for a laminated iron core according to claim 1, wherein the first welding step further comprises a temperature measurement step of sequentially measuring a temperature of the first welded parts, and
a timing to start the second welding step is decided based on the temperature of the first welded parts.

3. The manufacturing method for a laminated iron core according to claim 1, wherein the laminated iron core is composed of N (N is an integer) number of the iron core laminae, and
the pitch at which the welded parts are formed is changed such that at least one of the welded parts is formed on an N-th iron core lamina.

4. The manufacturing method for a laminated iron core according to claim 1, further comprising a third welding step of forming, after the second welding step, third welded parts, which constitute the multiple welded parts, at a third pitch in the stacking direction on a third iron core lamina group composed of a part of the multiple iron core laminae adjoining the second iron core lamina group, the third pitch being different from the second pitch.

5. The manufacturing method for a laminated iron core according to claim 4, wherein the third pitch is greater than the second pitch.

6. The manufacturing method for a laminated iron core according to claim 4, wherein the first welding step, the second welding step, and the third welding step are executed repeatedly.

7. The manufacturing method for a laminated iron core according to claim 4, wherein the third pitch is smaller than the second pitch.

8. The manufacturing method for a laminated iron core according to claim 7, wherein the third pitch is the same as the first pitch.

9. A manufacturing device for a laminated iron core for joining multiple iron core laminae by successively forming multiple spot-shaped welded parts on the multiple iron core laminae that are stacked, the manufacturing device comprising:

a laser irradiation unit configured to irradiate spot-shaped laser light onto the multiple iron core laminae thereby to form the multiple welded parts; and a laser controller configured to control irradiation of the laser light by the laser irradiation unit, wherein, under control of the laser controller, the laser irradiation unit forms first welded parts, which constitute the multiple welded parts, at a first pitch in a stacking direction on a first iron core lamina group composed of a part of the multiple iron core laminae, and forms second welded parts, which constitute the multiple welded parts, at a second pitch in the stacking direction on a second iron core lamina group composed of a part of the multiple iron core laminae adjoining the first iron core lamina group, and wherein the second pitch is greater than the first pitch.

10. The manufacturing device for a laminated iron core according to claim 9, further comprising a progressive die configured to sequentially punch the multiple iron core laminae from a sheet steel strip that is intermittently conveyed and to stack the multiple iron core laminae, wherein the laser irradiation unit is provided in the progressive die so as to be capable of irradiating the laser light into an iron core holding member configured to hold the iron core laminae whose outer shape has been punched from the sheet steel strip.

11. The manufacturing device for a laminated iron core according to claim 9, further comprising a temperature sensor configured to sequentially measure a temperature of the first welded parts, wherein the laser controller decides a timing to start formation of the second welded parts based on the temperature of the first welded parts.

12. The manufacturing method for a laminated iron core according to claim 9, wherein the laminated iron core is composed of N (Nis an integer) number of iron core laminae, and at least one of the welded parts is formed on an N-th iron core lamina.

13. The manufacturing device for a laminated iron core according to claim 9, wherein, under control of the laser controller, the laser irradiation unit forms third welded parts, which constitute the multiple welded parts, at a third pitch in the stacking direction on a third iron core lamina group composed of a part of the multiple iron core laminae adjoining the second iron core lamina group, the third pitch being different from the second pitch.

14. The manufacturing device for a laminated iron core according to claim 13, wherein the laser irradiation unit is configured to repeatedly execute formation of the first welded parts, the second welded parts, and the third welded parts.

15. A laminated iron core comprising multiple iron core laminae joined by multiple spot-shaped welded parts successively formed on the multiple iron core laminae that are stacked, wherein the multiple welded parts comprise:

first welded parts formed at a first pitch in a stacking direction of the multiple iron core laminae on a first iron core lamina group composed of a part of the multiple iron core laminae; and second welded parts formed at a second pitch in the stacking direction on a second iron core lamina group composed of a part of the multiple iron core laminae adjoining the first iron core lamina group, and wherein the second pitch is greater than the first pitch.

\* \* \* \* \*